United States Patent
Hopkins et al.

(10) Patent No.: US 11,898,519 B1
(45) Date of Patent: Feb. 13, 2024

(54) HEATING SYSTEM FOR A SPACECRAFT

(71) Applicant: LOCKHEED MARTIN CORPORATION, Bethesda, MD (US)

(72) Inventors: Joshua Benjamin Hopkins, Littleton, CO (US); Richard Wayne Warwick, Highlands Ranch, CO (US); Brian Paul Dempsey, Littleton, CO (US); Carey Lee Parish, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/588,088

(22) Filed: Jan. 28, 2022

(51) Int. Cl.
  *F02K 9/68* (2006.01)
  *F02K 9/42* (2006.01)
  *F02K 9/58* (2006.01)
  *B64G 1/40* (2006.01)

(52) U.S. Cl.
  CPC .................. *F02K 9/68* (2013.01); *F02K 9/42* (2013.01); *F02K 9/58* (2013.01); *B64G 1/401* (2013.01)

(58) Field of Classification Search
  CPC ... F02K 9/42; F02K 9/425; F02K 9/44; F02K 9/46; F02K 9/48; F02K 9/50; F02K 9/52; F02K 9/68; B64G 1/401
  See application file for complete search history.

(56) References Cited

U.S. PATENT DOCUMENTS

| | | | | |
|---|---|---|---|---|
| 2,992,527 A * | 7/1961 | Masnik | ..................... | F02C 7/00 60/39.463 |
| 3,138,928 A * | 6/1964 | Oppenheimer | ........ | B64G 1/402 60/39.48 |
| 3,286,954 A | 11/1966 | Swet | | |
| 3,514,953 A * | 6/1970 | Kephart | ..................... | F02K 9/68 60/39.462 |
| 3,732,693 A * | 5/1973 | Chu | ......................... | F02K 9/72 60/252 |
| 4,297,152 A * | 10/1981 | Frankel | ................... | C06B 25/00 60/205 |
| 4,385,489 A * | 5/1983 | Abbott | ..................... | F02K 9/50 60/776 |
| 5,003,772 A * | 4/1991 | Huber | ...................... | F02K 9/48 60/260 |
| 5,207,399 A * | 5/1993 | Risberg | .................... | F02K 9/50 137/340 |
| 5,279,484 A | 1/1994 | Zimmerman et al. | | |
| 5,395,076 A * | 3/1995 | Lichtin | .................... | F02K 9/80 244/169 |
| 5,746,050 A * | 5/1998 | McLean | ................... | F02K 9/50 60/200.1 |
| 5,950,543 A * | 9/1999 | Oster | ..................... | B61B 13/10 104/130.05 |

(Continued)

*Primary Examiner* — William H Rodriguez
(74) *Attorney, Agent, or Firm* — BAKERHOSTETLER

(57) ABSTRACT

A heating system for a component within a compartment of a spacecraft includes a fuel source, a gas generator, and a heat sink. The fuel source includes hydrazine. The gas generator is in fluid communication with the fuel source. The gas generator includes a catalyst. The catalyst is configured to decompose the hydrazine and generate an exhaust gas. The heat sink is thermally coupled to the gas generator and configured to receive heat from the exhaust gas of the gas generator. The heat sink is thermally coupled to the component within the compartment of the spacecraft to transfer heat from the exhaust gas to the component.

17 Claims, 1 Drawing Sheet

(56) References Cited

U.S. PATENT DOCUMENTS

| | | | | |
|---|---|---|---|---|
| 5,954,298 | A | 9/1999 | Basuthakur et al. | |
| 6,047,541 | A * | 4/2000 | Hampsten | B64G 1/402 |
| | | | | 60/259 |
| 6,338,253 | B1 * | 1/2002 | Freedman | F17C 7/04 |
| | | | | 62/48.1 |
| 6,612,522 | B1 * | 9/2003 | Aldrin | B64G 1/002 |
| | | | | 244/171.1 |
| 6,684,759 | B1 * | 2/2004 | Gorokhovsky | C30B 25/10 |
| | | | | 99/422 |
| 10,718,294 | B1 | 7/2020 | Zegler | |
| 2005/0206166 | A1 * | 9/2005 | Ganev | H02K 7/083 |
| | | | | 290/1 R |
| 2009/0145163 | A1 * | 6/2009 | Hyde | B65B 11/50 |
| | | | | 62/438 |
| 2010/0190241 | A1 * | 7/2010 | Jaggi | C12M 25/06 |
| | | | | 435/292.1 |
| 2012/0000918 | A1 * | 1/2012 | Deane | B65D 81/3834 |
| | | | | 220/592.2 |

\* cited by examiner

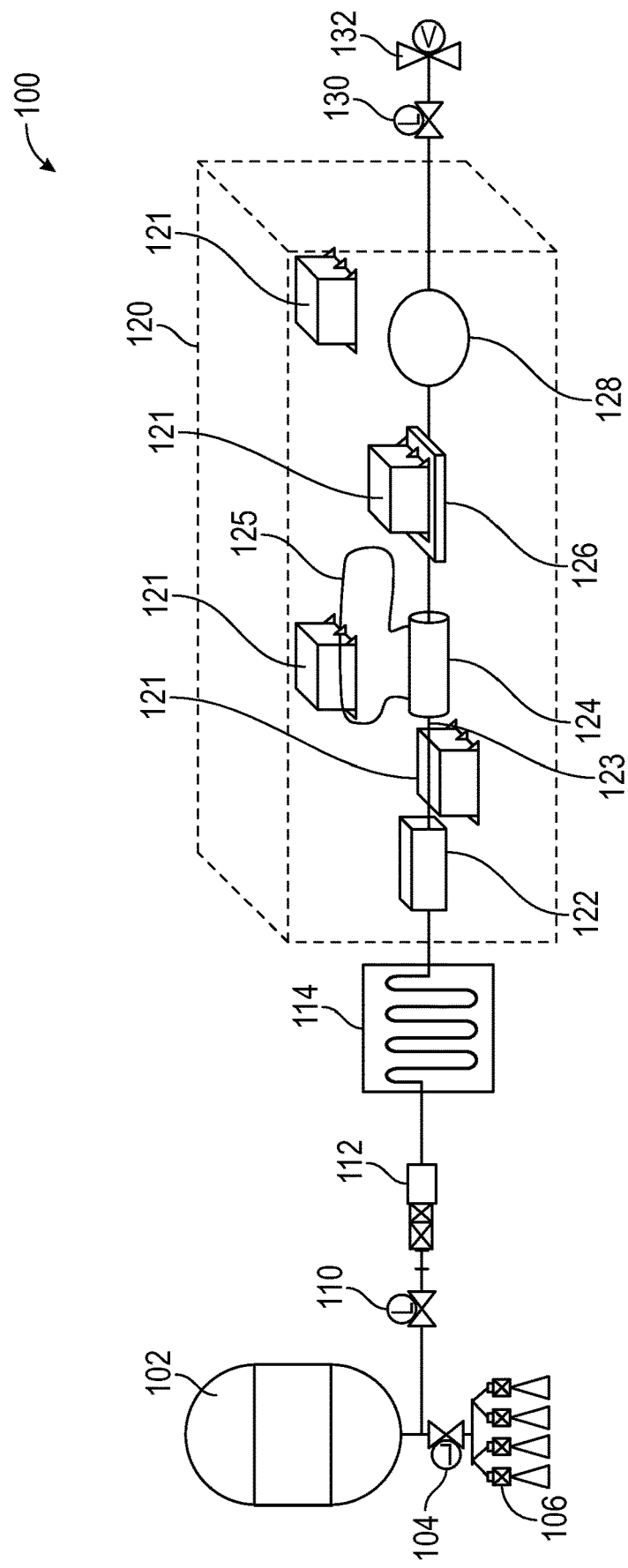

HEATING SYSTEM FOR A SPACECRAFT

STATEMENT REGARDING FEDERALLY SPONSORED RESEARCH OR DEVELOPMENT

Not applicable.

BACKGROUND

Field

The present description relates in general to systems for spacecraft, and more particularly to, for example, without limitation, heating systems for spacecraft.

Description of the Related Art

The description provided in the background section should not be assumed to be prior art merely because it is mentioned in or associated with the background section. The background section may include information that describes one or more aspects of the subject technology.

Lunar landers and other spacecraft can be used to acquire data from scientifically important regions. In some applications, lunar landers and other spacecraft are utilized in planetary environments such as the Moon, Titan, or Mars that are cold and/or dark. For example, certain lunar landers or rovers which are intended to last more than one lunar day (350 hours) must survive a very long period overnight (350 hours) without sunlight for solar power or heat, when the lunar surface reaches temperatures as low as −175 C (−275 F). In certain applications, a lunar lander may be used in lunar polar regions which have extended periods of darkness, or permanent darkness and temperatures below −200 C (−328 F). In another example, Saturn's moon Titan is also very cold, with temperatures below −270 C (−454 F), and always receives very little sunlight because of its distance from the sun and heavy cloud cover. In some applications, the components of certain lunar landers or spacecraft may not withstand environments that are too cold and/or too dark and may not allow the vehicle to operate.

It would be advantageous to provide a lunar lander or spacecraft that can withstand cold and/or dark environments to allow for operation in scientifically important areas.

SUMMARY

The subject technology is illustrated, for example, according to various aspects described below.

According to some embodiments, a heating system for a component within a compartment of a spacecraft includes a fuel source comprising hydrazine; a gas generator in fluid communication with the fuel source, the gas generator comprising a catalyst, wherein the catalyst is configured to decompose the hydrazine and generate an exhaust gas; and a heat sink thermally coupled to the gas generator and configured to receive heat from the exhaust gas of the gas generator, wherein the heat sink is thermally coupled to the component within the compartment of the spacecraft to transfer heat from the exhaust gas to the component.

In some applications, the heating system includes a non-propulsive vent in fluid communication with the gas generator, wherein the non-propulsive vent is configured to release the exhaust gas outside of the spacecraft. The heating system can also include an exhaust plenum in fluid communication with the gas generator, wherein the exhaust plenum is configured to temporarily retain the exhaust gas and release the exhaust gas through the non-propulsive vent.

In some embodiments, the heat sink includes (1) a metal selected from a group consisting of: INCONEL™, beryllium, aluminum, titanium, nickel, and steel, (2) a metal tank defining a tank volume, wherein the tank volume contains a thermal fluid selected from a group consisting of: water, ammonia, glycol, and ethanol, and/or (3) a phase-change device comprising paraffin or ice.

Further, the catalyst can be at least partially formed from iridium.

According to some embodiments, a spacecraft, includes a compartment defined within the spacecraft; a component disposed within the compartment; a fuel source comprising a fuel; a rocket engine in fluid communication with the fuel source, wherein the rocket engine is configured to decompose the fuel and generate a propulsive exhaust gas to propel the spacecraft; and a heating system, comprising: a gas generator in fluid communication with the fuel source, the gas generator comprising a catalyst, wherein the catalyst is configured to decompose the fuel and generate an exhaust gas; and a heat sink thermally coupled to the gas generator and configured to receive heat from the exhaust gas of the gas generator, wherein the heat sink is thermally coupled to the component within the compartment of the spacecraft to transfer heat from the exhaust gas to the component.

In some applications the catalyst can be configured to decompose the fuel at a higher ammonia disassociation relative to the rocket engine.

In some embodiments, the fuel of the fuel source can include hydrazine, a hydrazine blend, LMP-103S, AF-M315E, hydrogen peroxide, or nitrous oxide.

In some applications, the spacecraft can include a radiator thermally coupled to the gas generator and configured to transfer heat from the exhaust gas to outside of the spacecraft.

In some applications, the spacecraft includes a non-propulsive vent in fluid communication with the gas generator, wherein the non-propulsive vent is configured to release the exhaust gas outside of the spacecraft. The spacecraft can also include an exhaust plenum in fluid communication with the gas generator, wherein the exhaust plenum is configured to temporarily retain the exhaust gas in order to extract more heat, and release the exhaust gas through the non-propulsive vent.

In some embodiments, the heat sink includes (1) a metal selected from a group consisting of: INCONEL™, beryllium, aluminum, titanium, nickel, and steel, (2) a metal tank defining a tank volume, wherein the tank volume contains a thermal fluid selected from a group consisting of: water, ammonia, glycol, and ethanol, and/or (3) a phase-change device comprising paraffin or ice.

Further, the catalyst can be at least partially formed from iridium.

According to some embodiments, a method includes decomposing fuel from a fuel source to generate an exhaust gas via a gas generator; transferring heat from the exhaust gas to a component within a compartment of a spacecraft; and releasing the exhaust gas outside the spacecraft via a non-propulsive vent in fluid communication with the gas generator.

The method can further include decomposing fuel from the fuel source to generate a propulsive exhaust gas via a rocket engine; and propelling the spacecraft via the propulsive exhaust gas.

In some embodiments, decomposing fuel from the fuel source via the gas generator disassociates a higher amount of ammonia relative to decomposing fuel from the fuel source via the rocket engine In the following description, specific embodiments are described to shown by way of illustration how the invention may be practiced. It is to be understood that other embodiments may be utilized and changes may be made without departing from the scope of the present invention.

BRIEF DESCRIPTION OF THE DRAWING

FIG. 1 is schematic view of a heating system for a spacecraft, according to some embodiments of the present disclosure.

DETAILED DESCRIPTION

As described herein, lunar landers and other spacecraft can be utilized in planetary environments that are cold and/or dark. Further, certain lunar landers or rovers may be required to operate during an overnight period (350 hours) without sunlight or heat, when the lunar surface reaches temperatures as low as −175 C (−275 F). In certain applications, a lunar lander may be used in lunar polar regions which have extended periods of darkness, or permanent darkness and temperatures below −200 C (−328 F).

In some applications, missions for certain conventional spacecraft are designed to last a single lunar daytime period (approximately 2 weeks) to avoid the harsh conditions of the lunar night period. However, such strategic mission planning may not allow for extended exploration or exploration of regions with extended periods of darkness or permanent darkness.

Further, in some applications, certain conventional spacecraft can utilize battery-powered heater systems, which may add up to 175 kg to the weight of the vehicle. In other applications, certain conventional spacecraft can utilize nuclear power, such as a radioisotope thermoelectric generator (RTG) or a radioisotope heater unit (RHU) to heat components of the spacecraft. However, nuclear powered heating systems can be cost-prohibitive for low cost lunar missions and may require regulatory approval.

Therefore, it is desirable to provide a heating system that allows for effective heating of components of a spacecraft, without adding significant weight or cost to the spacecraft and without requiring regulatory approval.

As appreciated by the present disclosure, embodiments of the heating system described herein allow for effective heating of the components of a spacecraft without adding significant weight or cost to the spacecraft. For example, embodiments of the heating system described herein can effective heating of components of the spacecraft while reducing mass by 15 times compared to battery powered heater systems.

The present description relates in general to heating systems, and more particularly to, for example, without limitation, heating systems for a spacecraft.

FIG. 1 is schematic view of a heating system 100 for a spacecraft, according to some embodiments of the present disclosure. With reference to FIG. 1, a lunar lander, rover, or spacecraft can be deployed to environment to allow data collection or other activities.

In certain applications, the spacecraft can be deployed to a desired location using propulsion system. In the depicted example, rocket engines 106 can provide directional thrust or propulsion to the spacecraft by burning or decomposing fuel from the fuel source 102. One or more valves 104 can control fuel flow from the fuel source 102 to the rocket engines 106.

In some embodiments, the rocket engines 106 can utilize hydrazine as a fuel source. Optionally, the rocket engines 106 can be configured to use a hydrazine/hydroxyethylhydrazine blend, LMP-103S, AF-M315E, hydrogen peroxide, and/or nitrous oxide.

Prior to a mission, the fuel tank or fuel source 102 can be filled with an estimated amount of fuel needed for landing the spacecraft. However, since the amount of fuel required for landing the spacecraft can vary, the fuel source 102 may include excess fuel after landing. In some applications, the fuel source 102 may have approximately 25 to 75 kg of excess, residual, or marginal fuel. As described herein, the excess fuel stored in the fuel source 102 may be utilized to fuel the heating system 100 and heat components 121 of the spacecraft.

In the depicted example, the spacecraft can include one or more components 121 for avionics, data collection, power delivery, etc. In some applications, the components 121 can be sensitive to temperatures and may require heating to withstand or operate in cold environments. In the depicted example, components 121 of the spacecraft can be disposed within one or more compartments 120 disposed at least partially within the interior of the spacecraft.

As illustrated, the heating system 100 can heat one or more components 121 of the spacecraft. Advantageously, the heating system 100 can utilize excess fuel from the propulsion system (e.g. the rocket engines 106) of the spacecraft to keep components 121, compartments 120, and other portions of the spacecraft warm in cold environments, such as a lunar night. In the depicted example, excess fuel can be stored at the fuel source 102 until the heating system 100 is required (e.g. during lunar night). Advantageously, by utilizing excess fuel from the propulsion system in the heating system 100, the total weight of the spacecraft can be minimized while allowing for robust heating of the components 121. In certain embodiments, excess fuel can be intentionally added to the fuel source 102 prior to a mission to allow the gas generator 112 to be operated for a predetermined period of time. Optionally, the heating system 100 can utilize fuel from a reaction control system or may include a dedicated fuel supply for the gas generator 112. In some applications, a dedicated fuel supply can allow for the gas generator 112 to be operated for a predetermined period of time and/or utilize a different fuel compared to the rocket engines 106. For example, the gas generator 112 can be configured to decompose hydrazine, hydrazine/hydroxyethylhydrazine blend, LMP-103S, AF-M315E, hydrogen peroxide, and/or nitrous oxide while the rocket engines 106 can use a different fuel, such as a hydrazine/hyrdoxyethylhydrazine blend, LMP-103S, AF-M315E, hydrogen peroxide, and/or nitrous oxide, or a fuel/oxidizer blend such as hydrogen/oxygen, methane/oxygen, monomethyl hydrazine/nitrogen tetroxide, or other propellants.

In the depicted example, the gas generator 112 generates hot exhaust gas from the fuel from the fuel source 102. As described herein, heat from the hot exhaust gasses can be transferred to one or more components 121 of the spacecraft. The gas generator 112 directs fuel flow over a catalyst bed to decompose the fuel and generate hot exhaust gas. In some embodiments, the catalyst bed is at least partially formed from iridium. Optionally, the gas generator 112 can be utilized to generate electricity for the spacecraft using thermoelectric conversion or a turbine.

In some applications where the gas generator 112 utilizes hydrazine, the heat produced by the decomposition of the hydrazine is 3484−1910*X kJ/kg, where X is the fraction of NH3 (ammonia) dissociated, which ranges 0.3-0.8. Optionally, the catalyst can be tailored to control the fraction of ammonia that disassociates during decomposition of the hydrazine. For example, the catalyst of the gas generator 112 can be tailored to provide a higher level of disassociation of ammonia (X=0.5 to 0.8) compared to the level of disassociation of ammonia of the rocket engine 106, minimizing the build up of ammonia in the heating system 100.

For example, assuming 50% of ammonia is dissociated, a gas generator 112 decomposing hydrazine can generate:

(3484−1910*0.5 kJ/kg)*1 kg/350 hrs*(1 W per J*s)
=2 W heat over the duration of one lunar night
per kg of hydrazine.

In certain applications, a spacecraft may require 25 to 100 watts of thermal power to withstand the temperatures of a lunar night. Advantageously, the heat energy provided by decomposing residual fuel (e.g. 25 to 75 kg) is sufficient to warm the spacecraft for multiple lunar nights.

In some embodiments, the heating system 100 includes one or more valves 110 to control the heat output by the gas generator 112. With reference to the equation above, the valves 110 can control the flow of fuel from the fuel source 102 to control the amount of heat generated by the gas generator 112. For example, fuel flow to the gas generator 112 can be increased to increase total heat output of the heating system 100 and fuel flow to the gas generator 112 can be decreased to decrease total heat output of the heating system 100.

In some embodiments, the operation of the valves 110 and therefore the heat output of the gas generator 112 can be passively or actively controlled. For example, in a passive configuration, the valves 110 can be opened at a desired time (e.g. lunar dusk) to provide a predetermined low steady-state flow rate to the gas generator 112 provide desired heating of the components 121. In some embodiments, the desired amount of heating for the components 121 can be predicated or calculated based on characteristics of the components 121, the compartment 120, the heat sinks, and the environment. In certain applications, the flow rate to the gas generator 112 can be calculated or predicted to provide a desired heat output. Accordingly, the position of the valves 110 can be calculated or predicted to provide a desired flow rate to the gas generator 112, and in turn the desired heat output.

Optionally, in an active configuration, the valves 110 can be opened and closed to control the heat output of the gas generator 112 based on the temperature of components 121 or other portions of the spacecraft. For example, the valves 110 can be configured to open in response to a component temperature below a temperature threshold to provide fuel flow to the gas generator 112 to provide heat to the components 121. Further, the valves 110 can be configured to close in response to the component temperature above the temperature threshold to halt or reduce fuel flow to the gas generator 112, reducing heat to the components 121. Similarly, the desired amount of heating for the components 121 can be predicted or calculated based on the component temperature, characteristics of the components 121, the compartment 120, the heat sinks, and the environment. In certain applications, the flow rate to the gas generator 112 can be calculated or predicted to provide a desired heat output. In some embodiments, the valves 110 can be actively positioned between fully opened and fully closed to adjust the fuel flow rate delivered to the gas generator 112 and therefore adjust the heat output of the gas generator based on the component temperature. Accordingly, the position of the valves 110 can be calculated or predicted to provide a desired flow rate to the gas generator 112, and in turn the desired heat output based on the component temperature.

In the depicted example, hot exhaust gas from the gas generator 112 can be utilized to warm regions, compartments 120, and/or components 121 of the spacecraft. Components 121 can include, but are not limited to the avionics, instrument payloads, and/or the fuel source 102. During operation, heat from the exhaust gas can be transferred to components 121 via a network of heat transfer devices. Heat from the exhaust gasses can be released or otherwise transferred via elements of the heating system 100.

As illustrated, heat from the exhaust gasses can be transferred to components 121 of the spacecraft through one or more metallic heat sinks 122 in contact with the exhaust gas tubing. In the depicted example, the metallic heat sinks 122 can be formed from a material having a high specific heat and a high melting point to facilitate heat transfer from the exhaust gas to desired components 121 or volumes. Further, the metallic heat sinks 122 can retain heat provided by the gas generator 112 and convert short bursts of high temperature gas into sustained mild temperatures suitable for certain components 121. The metallic heat sinks 122 can be formed from INCONEL™, beryllium, aluminum, titanium, nickel, or steel.

In some embodiments, the metallic heat sinks 122 can be formed as dedicated thermal management elements that are coupled to, directly or indirectly, components 121 to be heated. In some embodiments, metallic heat sinks 122 utilized as dedicated thermal management elements can include structures with high heat capacity. For example, metallic heat sinks 122 can include blocks of metal with high heat capacity. Metallic heat sinks 122 can be include blocks of metal formed from INCONEL™, beryllium, aluminum, titanium, nickel, or steel.

In some embodiments, in addition to transferring heat within the spacecraft, tubing 123 can function as a heat sink to direct heat from the exhaust gasses to components 121. Tubing 123 can directly or indirectly provide heat to components 121 and/or compartments 120 of the spacecraft. For example, tubing 123 can be attached or coupled directly to one or more devices or components 121 to be heated. In some embodiments, tubing 123 can be attached to components 121 in a predetermined order to provide additional heat to desired components 121 and less heat to less temperature sensitive components 121.

In some applications, the tubing 123 can be routed through portions of the spacecraft, such as the compartment 120 to deliver heat to the volume of the compartment 120, indirectly providing heat to any components 121 therein. The compartment 120 may be insulated to retain heat.

In some embodiments, tubing 123 can be routed to deliver heat to other metallic spacecraft components to make use of the heat capacity of components which have other primary functions such as structural members, tanks, and/or cases holding electronic components 121. During operation, the heated metallic spacecraft components can transfer heat to the volume surrounding the heated metallic spacecraft components and/or any components 121 therein or in contact with the heated metallic spacecraft components. Tubing 123 can be formed from a metal, such as INCONEL™, beryllium, aluminum, titanium, nickel, or steel.

In some embodiments, heat from the exhaust gasses can be stored and transferred to components 121 of the spacecraft through a thermal fluid heat sink 124. In the depicted example, the thermal fluid heat sink 124 can store and transfer heat from the exhaust gas to components 121 of the spacecraft using a thermal fluid. In some embodiments, the thermal fluid heat sink 124 can define a tank to contain the thermal fluid. The thermal fluid can be a liquid with a high heat capacity, such as water, ammonia, glycol, or ethanol.

During operation, the thermal fluid of the thermal fluid heat sink 124 receives heat from the exhaust gas from the gas generator 112. The thermal energy stored in the thermal fluid can be transferred to one or more components 121. In some embodiments, the tank of the thermal fluid heat sink 124 can be directly coupled to one or more components 121 to transfer heat from the thermal fluid within.

In some embodiments, thermal fluid within the thermal fluid heat sink 124 can be circulated in a fluid loop 125 to transfer heat to components 121 spaced apart from the tank of the thermal fluid heat sink 124. The fluid loop 125 can be in fluid communication with the tank of the thermal fluid heat sink 124 and coupled to one or more components 121 to transfer heat from the exhaust gas to the coupled components 121. The thermal fluid within the thermal fluid heat sink 124 can be passively circulated or pumped through the fluid loop 125.

In some embodiments, heat from the exhaust gasses can be transferred to components 121 of the spacecraft through a phase-change heat sink 126. In the depicted example, a phase-change heat sink 126 can store and transfer heat from the exhaust gas to components 121 of the spacecraft using a phase-change material. In some embodiments, the phase-change heat sink 126 can define a container or volume containing the phase-change material. The phase-change material can be any suitable material, including, but not limited to, paraffin or ice.

During operation, the phase-change material of the phase-change heat sink 126 receives heat from the exhaust gas of the gas generator 112. The energy stored within the phase-change material can be transferred to one or more components 121. In some embodiments, the container of the phase-change heat sink 126 can be directly coupled to one or more components 121 to transfer heat from the phase-change material within.

When heat is transferred to and from the phase-change material, the phase-change material may change phase between solid and liquid (or liquid and gas). During a phase change of the phase-change material, the temperature of the phase-change material may remain near constant (e.g. near the melting point of the phase-change material). Therefore, the phase-change heat sink 126 may passively maintain a constant temperature for components 121 coupled thereto. In some applications, the phase-change heat sink 126 can be utilized at a lower temperature portion of the heating system 100 to maintain a desired temperature for certain components 121.

In some embodiments, the hot gas from the gas generator 112 can be cooled to lower temperatures more suitable for distribution and component heating by utilizing a radiator 114. The radiator 114 can cool exhaust gasses from the gas generator 112 by rejecting or transferring heat from the exhaust gas to outside the spacecraft. Exhaust gasses can be supplied to or otherwise flow through the radiator 114 to transfer heat from the exhaust gas to outside the spacecraft.

Optionally, a radiator 114 can be utilized in the heating system 100 in applications where the gas generator 112 is used with fuels that produce a high flame temperature and therefore a high exhaust gas temperature. In some applications, the radiator 114 can be utilized in applications where the gas generator 112 is used with fuels that produce a higher flame temperature than hydrazine. For example, the radiator 114 may be utilized in the heating system 100 in applications where AF-M315E, LMP-103S, or other suitable fuels are decomposed in the gas generator 112. Further, a heating system 100 may not include a radiator 114 in applications where the gas generator 112 is operated with hydrazine or other suitable fuels.

After heating components 121 of the spacecraft, the cooled exhaust gas from the gas generator 112 can be expelled. In the depicted example, the cooled exhaust gas is vented via a non-propulsive vent 132 configured to release the exhaust gas at low pressure and in multiple directions to avoid propelling the spacecraft or otherwise perturbing the position of the spacecraft. Flow of the exhaust gas to the non-propulsive vent 132 can be controlled by a vent valve 130. In some embodiments, exhaust gas may flow freely to the non-propulsive vent 132 without being controlled by a vent valve 130. Optionally, the exhaust gasses from the gas generator 112 are temporality retained in the exhaust gas plenum 128 to further extract energy from the exhaust gas.

In some applications, the exhaust gas is expelled at a relatively low velocity compared to the exhaust gas of the rocket engines 106, further preventing propulsion of the spacecraft, since the gas generator 112 is configured to decompose fuel at a relatively slow flow rate compared to the rocket engines 106 to provide a desired heat output and extend fuel life. Additionally, as described herein, the heating system 100 removes a significant amount of heat from the exhaust gas of the gas generator, reducing the energy of the exhaust gas flowing through the non-propulsive vent 132.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A heating system for a component within a compartment of a spacecraft, the heating system comprising:
   a fuel source comprising hydrazine;
   a gas generator in fluid communication with the fuel source, the gas generator comprising a catalyst, wherein the catalyst is configured to decompose the hydrazine and generate an exhaust gas;
   a heat sink thermally coupled to the gas generator and configured to receive heat from the exhaust gas of the gas generator, wherein the heat sink is thermally coupled to the component within the compartment of the spacecraft to transfer heat from the exhaust gas to the component; and
   a tubing indirectly coupled to the component and configured to function as another heat sink and to direct heat from the exhaust gas to the component.

2. The heating system of claim 1, further comprising a non-propulsive vent in fluid communication with the gas generator, wherein the non-propulsive vent is configured to release the exhaust gas outside of the spacecraft.

3. The heating system of claim 2, further comprising an exhaust plenum in fluid communication with the gas generator, wherein the exhaust plenum is configured to temporarily retain the exhaust gas and release the exhaust gas through the non-propulsive vent.

4. The heating system of claim 1, further comprising:
   controlling, based on one or more valves, a temperature of the component, thereby regulating the exhaust gas exiting the gas generator, wherein the one or more valves are further configured to control the temperature by opening at a predetermined time, thereby releasing the exhaust gas at the predetermined time.

5. The heating system of claim 4, wherein the one or more valves are further configured to control the temperature by being positioned to provide a predicted flow rate of the exhaust gas, thereby providing a predicted heat to the component.

6. The heating system of claim 4, wherein the heat sink comprises a phase-change device comprising paraffin or ice.

7. The heating system of claim 4, wherein the one or more valves are further configured to control the temperature of the component based on: opening in response to the temperature falling below a threshold temperature, and closing in response to the temperature rising above a threshold temperature.

8. A spacecraft, comprising:
   a compartment defined within the spacecraft;
   a component disposed within the compartment, wherein the component is selected from avionics; a fuel source comprising a fuel; a rocket engine in fluid communication with the fuel source, wherein the rocket engine is configured to decompose the fuel and generate a propulsive exhaust gas to propel the spacecraft; and
   a heating system, comprising:
   a gas generator in fluid communication with the fuel source, the gas generator comprising a catalyst, wherein the catalyst is configured to decompose the fuel and generate an exhaust gas; and
   a heat sink thermally coupled to the gas generator and configured to receive heat from the exhaust gas of the gas generator, wherein the heat sink is thermally coupled to the component within the compartment of the spacecraft to transfer heat from the exhaust gas to the component; and
   a tubing indirectly coupled to the component and configured to direct heat from the exhaust gas to the component.

9. The spacecraft of claim 8, wherein the catalyst is configured to decompose the fuel at a higher ammonia dissociation relative to the rocket engine.

10. The spacecraft of claim 8, wherein the fuel comprises hydrazine, a hydrazine blend, LMP-103S, AF-M315E, hydrogen peroxide, or nitrous oxide.

11. The spacecraft of claim 8, further comprising a radiator thermally coupled to the gas generator and configured to transfer heat from the exhaust gas to outside of the spacecraft.

12. The spacecraft of claim 8, further comprising a non-propulsive vent in fluid communication with the gas generator, wherein the non-propulsive vent is configured to release the exhaust gas outside of the spacecraft.

13. The spacecraft of claim 12, further comprising an exhaust plenum in fluid communication with the gas generator, wherein the exhaust plenum is configured to temporarily retain the exhaust gas and release the exhaust gas through the non-propulsive vent.

14. The spacecraft of claim 8, wherein the heat sink comprises a metal selected from a group consisting of: Inconel, beryllium, aluminum, titanium, nickel, and steel.

15. The spacecraft of claim 8, wherein the heat sink comprises a metal tank defining a tank volume, wherein the tank volume contains a thermal fluid selected from a group consisting of: water, ammonia, glycol, and ethanol.

16. The spacecraft of claim 8, wherein the heat sink comprises a phase-change device comprising paraffin or ice.

17. The spacecraft of claim 8, wherein the catalyst comprises iridium.

* * * * *